US005499844A

United States Patent [19]
Dirck

[11] Patent Number: 5,499,844
[45] Date of Patent: Mar. 19, 1996

[54] SAFETY RESTRAINT APPARATUS

[76] Inventor: Ronald L. Dirck, P.O. Box 196, Warsaw, Ind. 46580

[21] Appl. No.: 228,797

[22] Filed: Apr. 18, 1994

Related U.S. Application Data

[63] Continuation-in-part of Ser. No. 48,374, Apr. 15, 1993.

[51] Int. Cl.⁶ ................................................. B60R 21/02
[52] U.S. Cl. ........................................ 280/748; 297/487
[58] Field of Search ................................. 280/751, 748, 280/753; 297/488, 487; 104/241; 105/329.1; 244/122 R

[56] References Cited

U.S. PATENT DOCUMENTS

| | | | |
|---|---|---|---|
| 2,592,879 | 4/1952 | Eyerly | 297/487 |
| 2,661,221 | 12/1953 | Lockwood | 280/751 |
| 2,833,554 | 5/1958 | Ricordi | 297/488 |
| 3,191,994 | 6/1965 | Boyce | 297/466 |
| 3,392,989 | 7/1968 | Graham | 297/753 |
| 3,630,542 | 12/1971 | Wycech | 280/753 |
| 4,004,583 | 1/1977 | Johnson | 297/466 |
| 4,280,731 | 7/1981 | Pitts | 297/487 |
| 5,129,478 | 7/1992 | Svenaga et al. | 297/487 |

*Primary Examiner*—Karin L. Tyson
*Attorney, Agent, or Firm*—Baker & Daniels

[57] ABSTRACT

A safety restraint apparatus that includes an upper and lower frame which each have lock mechanisms conveniently located out of the reach of the prisoners and readily accessible to the law enforcement personnel from the entrance way. The upper restraint frame is pivotally connected to the ceiling and is suspended above the prisoners in a released position to prevent interference upon ingress and egress. The upper frame pivots downward into a restraint position to prevent the prisoners from standing or moving about within the vehicle. The lower restraint frame pivots horizontally into a restraint position to secure the prisoner's ankles and legs. Each restraint frame includes a padded cross bar which overlies the prisoners' upper and lower bodies not only to brace the prisoners against impact but also to prevent the prisoner from voluntarily moving about with in the vehicle. The upper and lower frames can be quickly pivoted between the restraint and entry positions from the entrance way without entering the prisoner area.

7 Claims, 3 Drawing Sheets

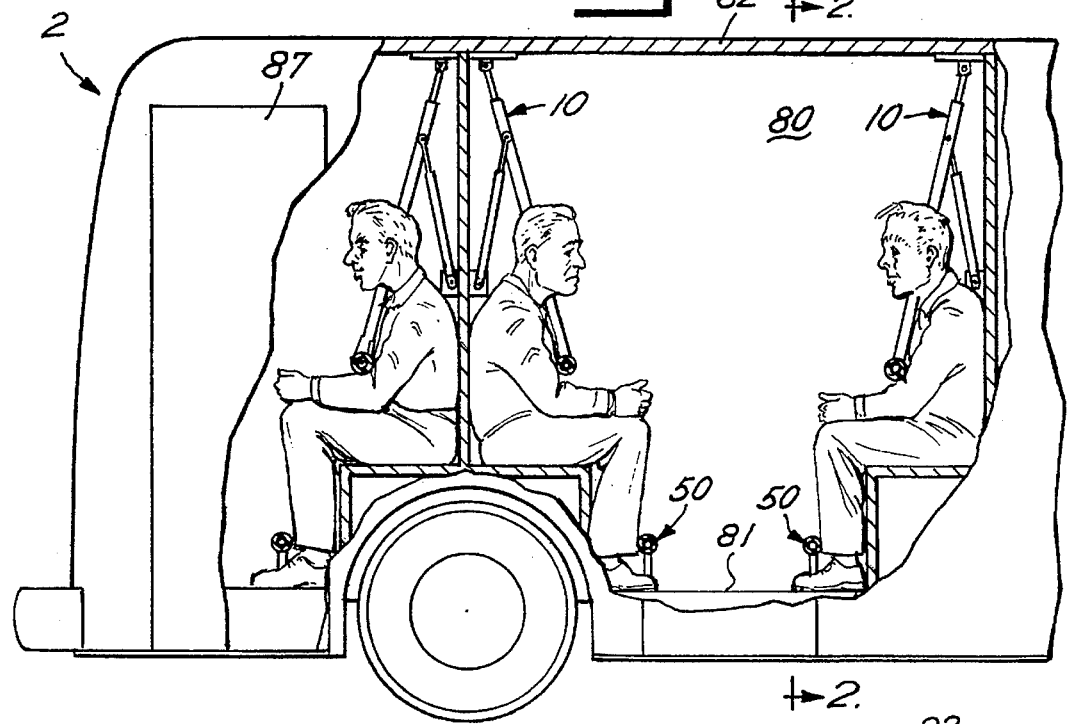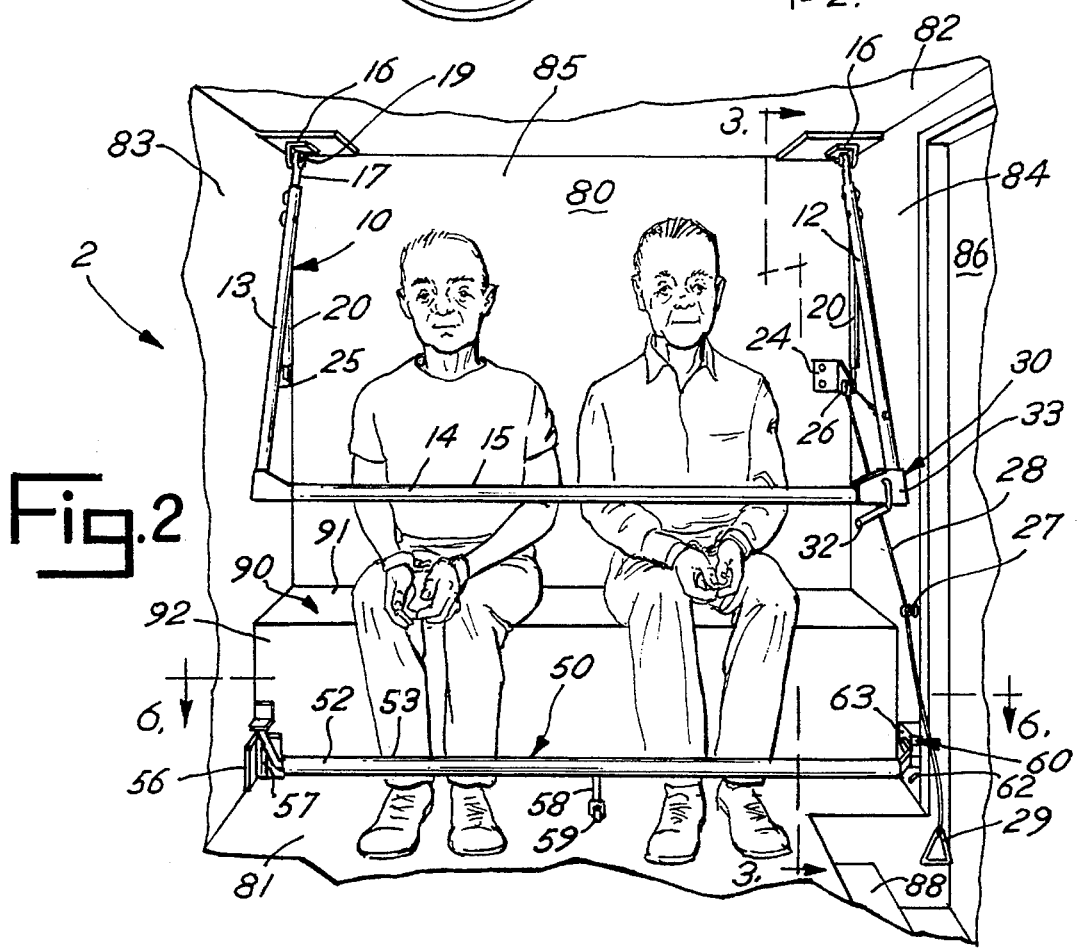

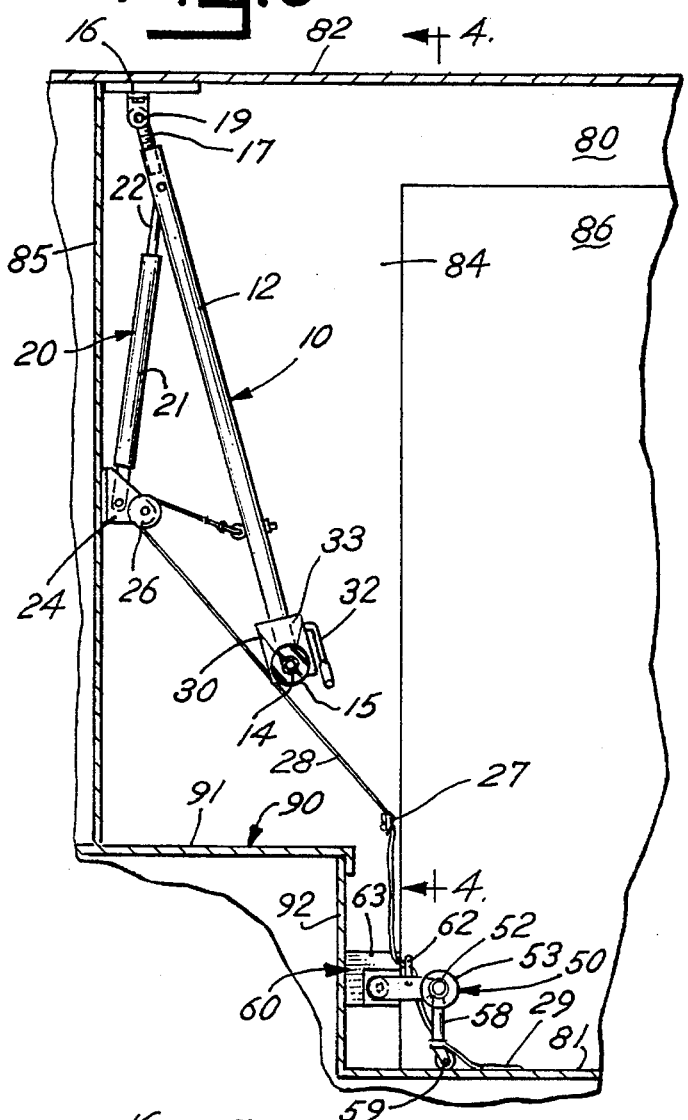
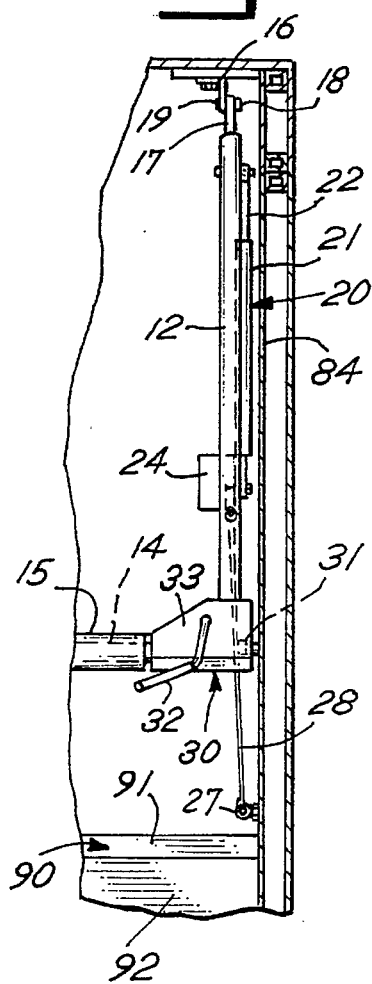
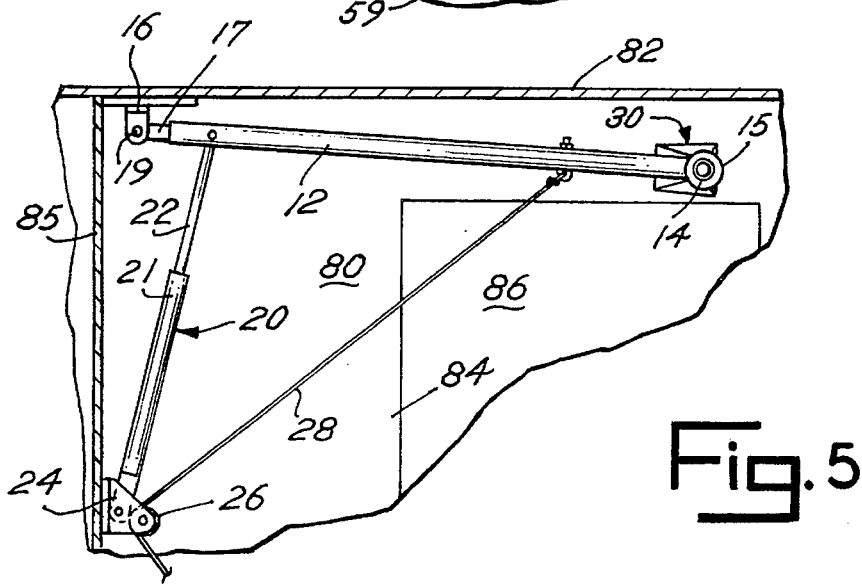

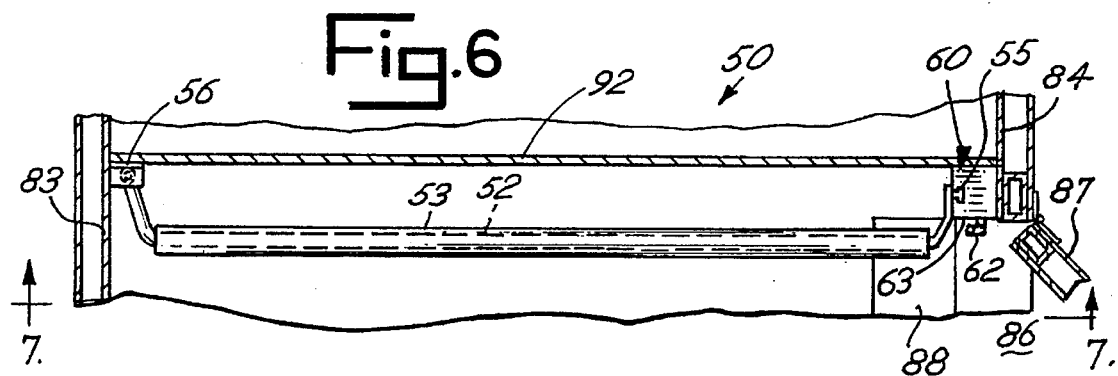
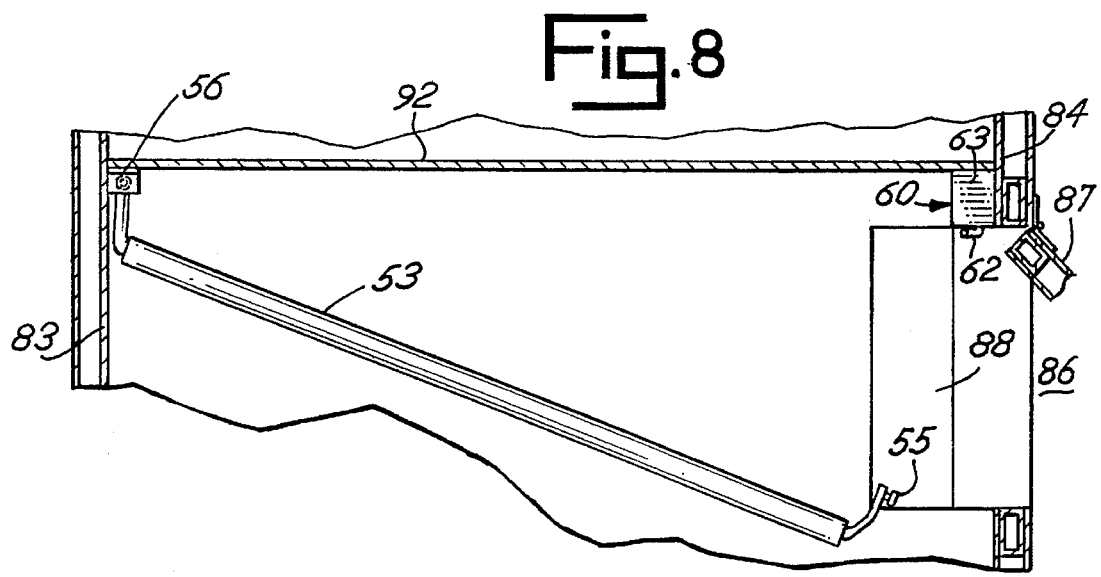
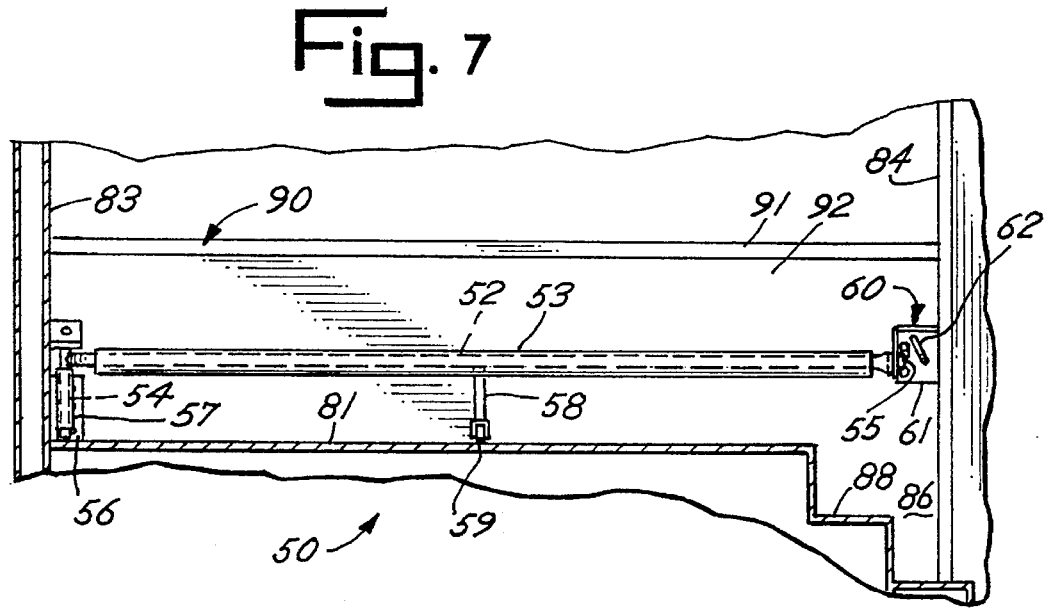

SAFETY RESTRAINT APPARATUS

CROSS REFERENCE TO RELATED APPLICATIONS

This is a continuation in part of U.S. patent application Ser. No. 08/048,374, entitled "SAFETY RESTRAINT APPARATUS", filed Apr. 15, 1993.

BACKGROUND OF THE INVENTION

1. Field of the Invention

This invention relates to a safety restraint apparatus for use in a vehicle, and in particular for use in a prisoner transportation vehicle.

2. Description of the Related Art

The transportation of prisoners, either from a jail to a courthouse or from one facility to another, has always presented law enforcement personnel with peculiar and special problems. The safety of the prisoner and the law enforcement personnel is of equal concern as to the potential for escape. Prisoner transportation vehicles and modules such as the ones described in U.S. Pat. Nos. 4,470,228 (Dirck) and 5,080,416 (Dirck) have been developed to transport prisoners and other individuals.

Generally, prisoners wear individual security restraints during transportation between various locations, such as prisons, work sites and courthouses. The conventional safety restraints such as lap and shoulder belts provide limited individual protection of bound prisoners during collisions, however, individual security restraints, such as hand-cuffs and leg-irons, prevent the prisoner from using his arms and hands to brace himself during sudden starts, stops, sharp turns and collisions, thus increasing the probability of injury. Often security restraints are fastened to permanent fixtures within the vehicle to prevent the prisoner from moving about within the vehicle. Consequently, each prisoner must be individually released from both the safety and security restraints by correction personnel before exiting the vehicle in the event of an emergency.

A problem with conventional mechanical restraint apparatus is that the restraint frame occupies valuable space inside the prisoner compartment.

Another problem is that the restraint apparatus often interferes with the ingress and egress through the entrance way to the prisoner compartment. Such interference can be hazardous in an emergency situation.

Yet another problem is the accessibility of the restraint's lock mechanism from the entrance way. The restraint apparatus should also be able to be released and locked into position from outside the prisoner area. When a guard or individual enters the prisoner area to actuate a lock mechanism on the restraint apparatus, the guard is at risk due to the proximity of the prisoners. Consequently, the lock mechanism must be not only out of the reach of the prisoners but accessible to the guards without requiring the guards to enter the prisoner area.

SUMMARY OF THE INVENTION

The safety restraint apparatus of this invention eliminates both security and safety problems of the conventional restraint apparatus. The safety restraint apparatus of this invention uses a padded frame to overlie the prisoners' upper and lower bodies not only to brace the prisoners against impact but also to prevent the prisoner from voluntarily moving about within the vehicle.

The safety restraint apparatus of this invention includes an upper and lower frame which each have lock mechanisms conveniently located out of the reach of the prisoners and readily accessible to the law enforcement personnel from the entrance way. The upper restraint frame is pivotally connected to the ceiling and is suspended above the prisoners in a released position to prevent interference upon ingress and egress. The upper frame pivots downward into a restraint position to prevent the prisoners from standing or moving about within the vehicle. The lower restraint frame pivots horizontally into a restraint position to secure the prisoner's ankles and legs. Each restraint frame includes a padded cross bar which overlies the prisoners' upper and lower bodies not only to brace the prisoners against impact but also to prevent the prisoner from voluntarily moving about with in the vehicle. The upper and lower frames can be quickly pivoted between the restraint and entry positions from the entrance way without entering the prisoner area.

An object of this invention is to provide an active safety restraint system for prisoners wearing hand and leg restraints.

Another object is to provide an active safety restraint system that prevents prisoners from freely moving within a vehicle.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a fragmentary side view of a prisoner compartment of a vehicle showing an embodiment of a safety restraint apparatus of the present invention;

FIG. 2 is a forward looking perspective view of the prisoner compartment taken along line 2—2 of FIG. 1;

FIG. 3 is a side view of the restraint apparatus in a locked position taken along line 3—3 of FIG. 2;

FIG. 4 is a forward looking view of the upper restraint frame in a locked position taken along line 4—4 of FIG. 3;

FIG. 5 is a side view of the restraint apparatus of FIGS. 2-4 in a released position;

FIG. 6 is a top sectional view of the lower restraint frame in a locked position taken along line 6—6 of FIG. 2;

FIG. 7 is a forward looking view of the lower restraint frame in a locked position taken along line 7—7 of FIG. 6; and FIG. 8 is a top sectional view of the lower restraint frame of FIGS. 6 and 7 shown in a released position.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Referring now to the drawings and particularly to FIGS. 1 and 2, there is shown a safety restraint apparatus 2 of the present invention. In the embodiment shown in FIG. 1, three restraint apparatus 2 are used in separate prisoner compartments of a conventional prisoner transport vehicle. Each restraint apparatus 2 of FIG. 1 has identical construction and operation. Restraint apparatus 2 includes an upper restraint frame 10 and a lower restraint frame 50. Restraint apparatus 2 can be adapted for use with any type of transportation vehicle and is not limited to any particular vehicle application. In addition, multiple restraint apparatus can be incorporated into any application as desired.

FIG. 2 illustrates restraint apparatus 2 in a typical application within a prisoner compartment 80; consequently, FIG. 2 will serve as a reference for the following description of the invention and its operation. As shown, prisoner compartment 80 includes a floor 81, ceiling 82, side walls 83, 84 and a back wall 85. Side wall 84 has an entrance way 86 enclosed by a door 87. As shown in FIG. 2, floor 81 may include steps 88 at entrance way 86 to provide convenient ingress and egress to prisoner compartment 80. A bench 90 extends from back wall 85 across the entire width of prisoner compartment 80. Bench 90 includes a horizontal seating area 91 and a vertical front wall or lower kick panel 92. The area underneath bench 90 can be utilized for storage, if desired.

Upper restraint frame 10 includes two spaced pivotal support legs 12, 13 connected by a cross bar 14. Cross bar 14 is horizontally secured to legs 12, 13 by welds. Cross bar 14 extends substantially across the width of the prisoner compartment 80. Cross bar 14 is covered by a pad 15. Pad 15 is made from any soft material suitable for preventing injuries to the prisoners, such as foam rubber.

Legs 12, 13 are pivotally connected to compartment ceiling 82 by a pair of L-shaped hinge brackets 16. Hinge brackets 16 are secured to compartment ceiling 82 by welds or bolts. Each leg 12, 13 includes an eye bolt 17 which is threaded axially into one end of each leg. Legs 12, 13 are pivotally connected to hinge brackets 16 by bolts 18 and nuts 19. Bolts 18 extend through aligned holes in bracket 16 and eye bolts 17 to allow vertical rotation of cross bar 14 about a horizontal axis. Upper restraint frame 10 pivots vertically between an entry position, wherein upper restraint frame 10 abuts against ceiling 82 and a restraint position, wherein upper restraint frame 10 extends diagonally over bench 90.

Two pneumatic cylinder props 20 are connected to each leg 12, 13. Each prop 20 includes a cylinder connected to back wall 85 by wall bracket 24 and piston 22 connected to each leg 12, 13. Wall brackets 24 are mounted to back wall 85 by any conventional method such as welds or rivets. One of wall brackets 24 includes pulley 26. Cable 28 is secured to leg 12 and passes through pulley 26. An eyelet 27 is mounted to side wall 84 near entrance way 86. The opposite end of cable 28 passes through eyelet 27 and is connected to a handle 29.

As shown in FIGS. 2–4, upper restraint frame 10 includes a lock mechanism 30 carried by cross bar 14. Lock mechanism 30 includes an outer housing 33 which encases the internal components thereof. The internal components include a pair of mechanical latch jaws (not shown) which engage a latch pin 31. Latch pin 31 is mounted to side wall 84. The latch jaws are operatively connected to a release handle 32 which extends from outer housing 33. Release handle 32 extends from the forward face of outer housing 33. As shown in FIG. 4, lock mechanism 30 overlies and restrictively engages latch pin 31 when upper restraint frame 10 is in its restraint position. Release handle 32 can be depressed to disengage the latch jaws from latch pin 31 to allow upper restraint frame 10 to swing upward to the entry position. Release handle 32 is positioned within prisoner compartment 80 to be inaccessible to the prisoners and readily accessible to law enforcement personnel standing near the entrance way.

FIGS. 6–7 illustrate the construction and operation of lower restraint frame 50. Lower restraint frame 50 includes a horizontal cross bar 52 and a lock mechanism 60. Cross bar 52 is covered by pads 53. A pad 53 is made from any soft material suitable for preventing injuries to the prisoners, such as foam rubber. Cross bar 52 is curved near each end for spacing it from kick plate 92. A latch pin 55 is mounted to the free end of cross bar 52. Cross bar 52 includes a head part 54 (FIG. 7) which is perpendicularly connected at an end of cross bar 52 opposite latch pin 55. As shown in FIG. 7, cross bar 52 is pivotally mounted at the interior side wall 83 of prisoner compartment 80. An L-shaped mounting plate 56 is connected to side wall 83 and kick plate 92 by welds or rivets. Mounting plate 56 includes a vertically oriented tubular hinge sleeve 57. Head part 54 is journalled within hinge sleeve 57 to allow radial movement of cross bar 52 about a vertical axis in a horizontal plane. Lower restraint frame 50 pivots between a restraint position shown in FIGS. 6 and 7 and an entry position shown in FIG. 8. A support leg 58, including caster 59 attached thereto, is centrally mounted to cross bar 52 to support the weight of lower restraint frame 50.

Lock mechanism 60 is mounted to side wall 84 near entrance way 86. Lock mechanism 60 includes an outer housing 63 which encases the internal components of the lock mechanism. The internal components include a pair of mechanical latch jaws and linkage (not shown) which engaged latch pin 55. The latch jaws are operatively connected to a release handle 62 which extends from lock mechanism 60. When lower restraint frame 50 is in its restraint position, latch pin 55 is restrictively engaged by the latch jaws. Rotating release handle 62, displaces the linkage to actuate the latch jaws and release the grip on latch pin 55. The grip of latch jaws released, cross bar 52 can be shifted to the entry position.

FIGS. 1 and 2 show upper and lower restraint frames 10, 50 in the restraint position. In the release position, upper restraint frame 10 is suspended against ceiling 82 above the prisoners as shown in FIG. 5 and lower restraint frame 50 is rotated away from bench 90 as shown in FIG. 8. With the restraint apparatus 10 in the release position, the prisoners are seated on bench 90. Upper restraint frame 10 can be used with one or more prisoners depending on the width of bench 90. The prisoners can be strapped to bench 90 with seat belts (not shown) for additional safety. Once the prisoners are seated, handle 32 is pulled, which draws upper restraint frame 10 towards the restraint position. In the restraint position, upper restraint bar 14 extends across the front of the prisoners' upper bodies. Moreover in the restraint position, lower restraint bar 52 extends across the prisoners' ankles as shown in FIG. 2.

During collisions or sudden shifts in the vehicle, the padded restraint bars 14, 52 protect the prisoners from injuries and from being tossed about within the vehicle. In addition to protecting the prisoners from injury, upper restraint cross bar 14 prevents the prisoners from freeing themselves during transport by reaching release handles 32, 62.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A safety restraint apparatus for use in a vehicle, the vehicle including an enclosure having a plurality of side walls, a ceiling, a floor, and an entry door in one of said side walls, the vehicle further including a seat disposed within the enclosure for seating the person, said safety restraint apparatus comprising:

a rigid upper restraint frame pivotally mounted to at least one of the ceiling and the walls, said upper restraint frame including a unitary rigid cross bar and being movable between an entry position wherein said cross bar is disposed adjacent to said ceiling, and a restraint position wherein said cross bar is disposed adjacent an upper body of the person when the person is seated upon the seat;

first locking means for releasably locking said upper restraint frame to one of said side walls when said upper restraint frame is in the restraint position, said first locking means including a pair of cooperating locking members, one of said locking members being mounted on said one side wall, the other locking member being mounted on the upper restraint frame, said first locking means being inaccessible to a person seated on said seat;

a rigid lower restraint frame pivotally mounted to one of said floor and said side walls, and including a unitary rigid cross bar, said lower restraint frame movable between an entry position and a restraint position, said cross bar disposed over the legs of the person when the person is seated upon the seat and when said lower restraint frame is in the restraint position; and second locking means for releasably locking said lower restraint frame to one of said side walls when said lower restraint frame is in the restraint position, said second locking means including a pair of cooperating locking devices, one of said locking devices being mounted on said one side wall, the other locking devices being located on the lower restraint frame, said second locking means being inaccessible to a person seated on said seat;

wherein said upper restraint frame and said lower restraint frame maintain the person in a seated position on the seat when said upper frame and said lower frame are in said restraint position.

2. The safety restraint apparatus of claim 1, wherein upper restraint frame is pivotal about a horizontal axis and said lower restraint frame is pivotal about a vertical axis.

3. An enclosure for mounting to a vehicle, comprising:

a plurality of side walls, a ceiling, a floor, and an entry door in one of said side walls;

a seat disposed within said enclosure and adjacent one of said walls, said seat including a vertical front wall; and a safety restraint apparatus comprising:

a rigid upper restraint frame including two legs, each said leg pivotally mounted at one end thereof to one of said ceiling and said one wall, said upper restraint frame further including a unitary rigid first cross bar means mounted between said legs at an opposite end of said legs, said upper restraint frame movable between an entry position wherein said legs are disposed at an acute angle to said ceiling, and a restraint position wherein said legs are disposed at an acute angle to said one wall, and said first cross bar means overlie the upper body of a person when seated in said seat;

first locking means for releasably locking said upper restraint frame to one of said side walls when said upper restraint frame is in the restraint position, said first locking means including a pair of cooperating locking members, one of said locking members being mounted on said one side wall, the other one of said locking members being mounted on the upper restraint frame, said first locking means being inaccessible to a person seated upon said seat;

a rigid lower restraint frame pivotally mounted to one of said floor and said side walls, and including a unitary rigid cross bar, said lower restraint frame movable between an entry position and a restraint position, said second cross bar means disposed generally parallel and adjacent to said vertical front wall when said lower restraint frame is in the restraint position overlying the legs of said person when seated in said seat;

second locking means for releasably locking said lower restraint frame to one of said side walls when said lower restraint frame is in the restraint position, said second locking means including a pair of cooperating locking devices, one of said locking devices being mounted on said one side wall, the other one of said locking devices being located on the lower restraint frame, said second locking means being inaccessible to a person seated upon said seat;

wherein said upper restraint frame and said lower restraint frame maintain the person in a seated position on the seat when said upper frame and said lower frame are in said restraint position.

4. The safety restraint apparatus of claim 3, wherein said upper restraint frame is pivotal about a horizontal axis and said lower restraint frame is pivotal about a vertical axis.

5. The safety restraint apparatus of claim 4, wherein said horizontal axis is disposed closely adjacent the ceiling of the enclosure, and said vertical axis is disposed closely adjacent the floor of the enclosure.

6. The safety restraint apparatus of claim 3, further comprising a fluid-filled piston and cylinder assembly connected at one end thereof to said upper restraint frame, and connected at an other end thereof to one of the ceiling and walls.

7. An enclosure for mounting to a vehicle, comprising:

a plurality of side walls and a floor;

a seat disposed within said enclosure and adjacent one of said walls for accommodating a person having legs, said seat including a vertical front wall;

a rigid restraint frame pivotally mounted to one of said floor and said side walls, and including a unitary rigid cross bar means, said lower restraint frame movable between an entry position and a restraint position, said cross bar means disposed generally parallel and adjacent to said seat vertical front wall when said lower restraint frame is in the restraint position for overlying said legs of said person when the person is seated on the seat; and means for releasably locking said lower restraint frame to one of said side wall panels when said lower restraint frame is in the restraint position, said locking means including a pair of cooperating locking members, one of said locking members being mounted on one of said side walls, the other one of said locking members being located on the lower restraint frame, said means being inaccessible to a person seated on said seat.

* * * * *